Patented Aug. 15, 1950

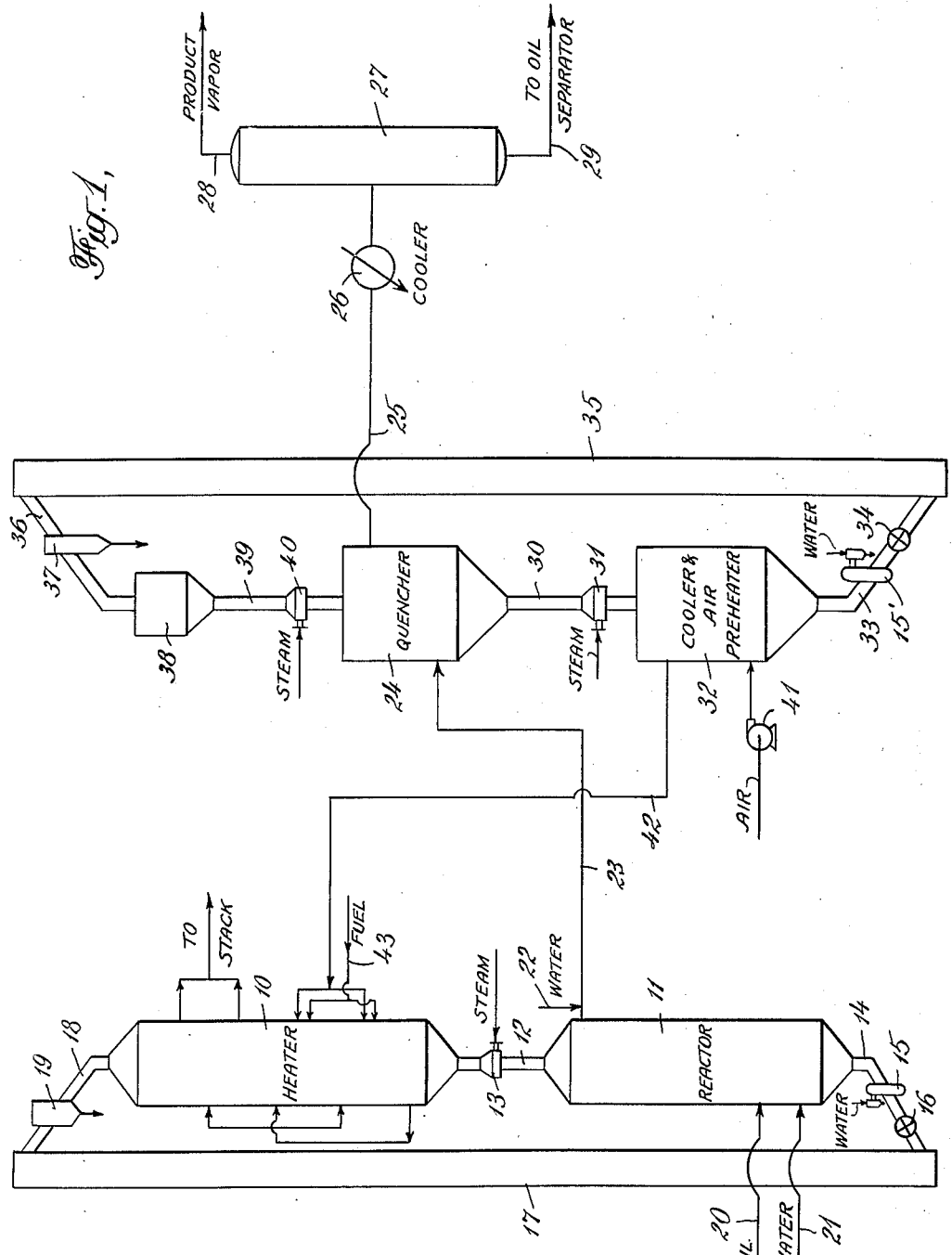

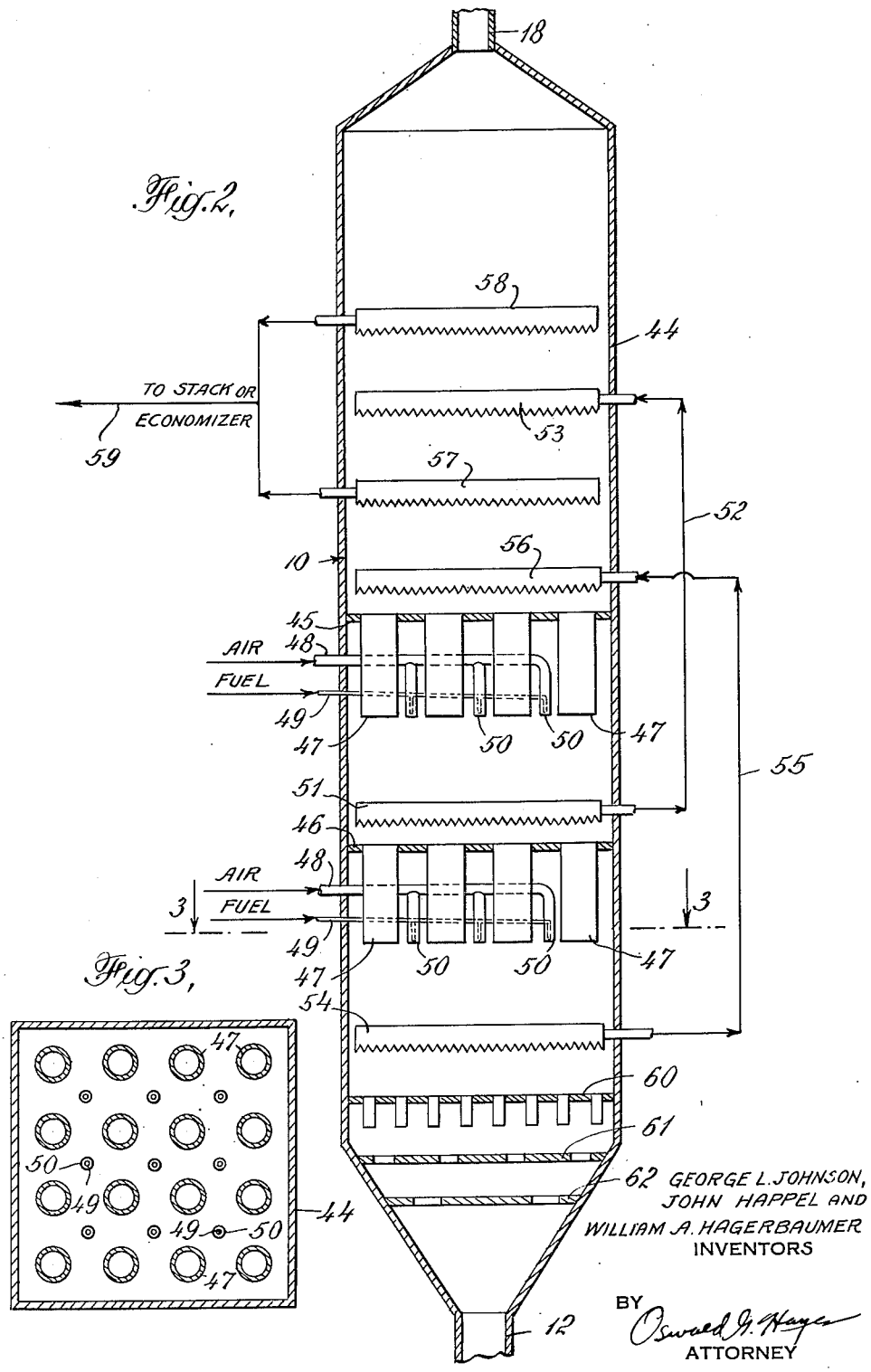

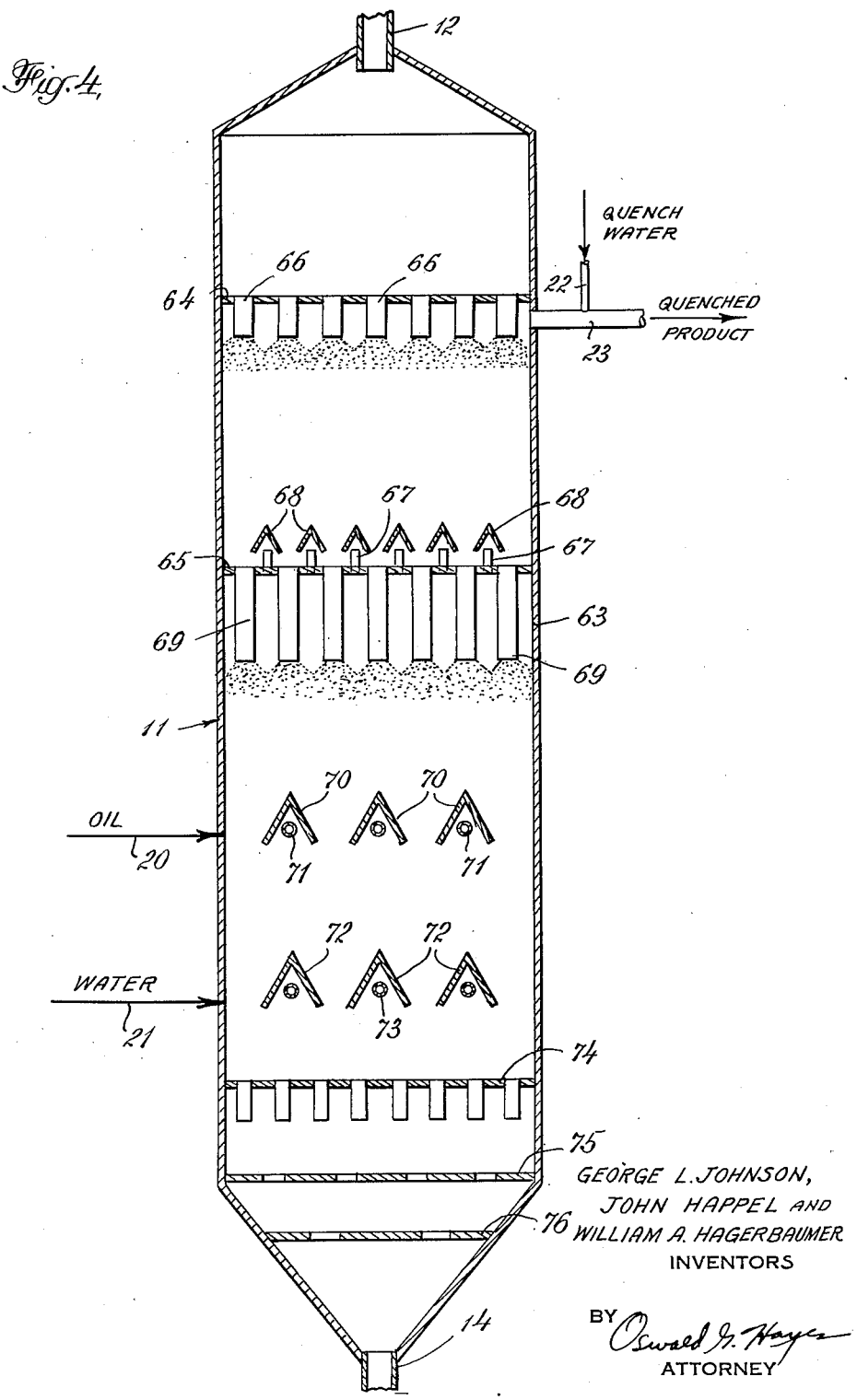

2,519,315

UNITED STATES PATENT OFFICE 2,519,315

METHOD AND APPARATUS FOR HEATING GRANULAR SOLIDS

George L. Johnson, New York, and John Happel, Brooklyn, N. Y., and William A. Hagerbaumer, Westfield, N. J., assignors to Socony-Vacuum Oil Company, Incorporated, a corporation of New York Application March 27, 1946, Serial No. 657,592

11 Claims. (Cl. 263—19)

This invention relates to a method and apparatus for rapidly raising the temperature of granular solids.

The invention is highly useful for preparing high temperature gradular solids to be used in a separate step for rapidly raising the temperature of reactant vapors to a desired reaction temperature. Such processes may be practiced for high temperature cracking of hydrocarbons, for example, cracking hydrocarbon gases, crude petroleum, gas oil, or the like to ethylene at about 1500° F. to 1700° F. or for the cracking of propane and the like to acetylene at temperatures on the order of 2300° F. Such reactions require relatively short reaction times in order to minimize the effects of secondary condensation reactions. These short reaction times at high temperatures can be obtained by passing the reactant gases in direct contact with highly heated granular solids and thereafter quenching the reaction mixture to inhibit further reaction.

This invention is particularly concerned with a heater for heating the granular solids to the elevated temperature desired for contact with the reactant fluid but certain specific features of the invention will be better understood when considered in connection with a complete process and the cracking of gas oil to ethylene will be regarded herein as exemplary without intending to limit the invention thereto.

The invention provides a process and apparatus means for generating high temperature products of combustion and directing the resultant gases through a mass of granular solids. The partially cooled gases are then transferred to contact with solids in an earlier stage of the process to thereby preheat solids in the earlier stage. In its preferred embodiments the invention utilizes two such contacting zones and two preheating zones with flue gases from the first high temperature zone being transferred to the first of the preheating zones.

Another highly advantageous feature of the invention is means for simultaneously obtaining uniform flow of solids through the apparatus and providing a combustion zone wherein flames are propagated, preferably in contact with the granular solids. When the flame is projected onto and penetrates the mass of granular solids, combustion proceeds on the surface of the solids which catalyze the combustion reaction thus giving more efficient burning of the fuel. This also renders it unnecessary to provide a high temperature furnace for generation of hot gases with the difficulties usually attendant thereon.

Further objects and advantages of the invention will be apparent from the specific forms shown in the annexed drawings, wherein Figure 1 is a flow sheet of apparatus for cracking of gas oil to ethylene in contact with a hot solid;

Figure 2 is a vertical section through the heater shown in Figure 1;

Figure 3 is a horizontal section on line 3—3 of Figure 2; and

Figure 4 is a vertical section through the reactor of Figure 1.

Referring particularly to Figure 1, the scheme shown involves the use of two separate circulating systems for granular solids. The reaction cycle includes a heater 10 for heating granular solids which are then passed to a reactor 11 in which they are contacted with a hydrocarbon charge to heat the same to reaction temperature. The feed leg 12 for transfer of solids from heater 10 to reactor 11 is preferably provided with a steam sealing chamber 13 to inhibit transfer of gases between heater 10 and reactor 11. Cooled solids from the bottom of reactor 11 pass through a pipe 14 fitted with a vacuum purging chamber 15 and a valve 16 to the bottom of elevator 17 which conveys the solids to a feed pipe 18 for return to the heater 10. Means may be provided to cool the solids moving to elevator 17 if the outlet temperature of reactor 11 is higher than that which can be tolerated by the elevator. Injection of water by fog nozzles is well adapted to this purpose. If the water be injected at chamber 15, the steam produced is exhausted as indicated. The water may be introduced to solids falling to the buckets at the bottom of the elevator, in which case, the elevator shaft also acts as an exhaust stack. Feed pipe 18 preferably includes a classifier 19 for removal from the system of granular solids of a size smaller than that desired. Oil and water for the reaction are admitted to reactor 11 by lines 20 and 21 wherein they are heated to the desired temperature. If desired, the oil and water charge may be admitted in liquid phase to be vaporized in the lower part of the reactor. Alternatively, vaporization may be accomplished in any suitable manner prior to admission to the reactor. The reaction mixture from the top of reactor 11 is promptly quenched to a reduced temperature, say 1200° F. by water admitted at 22 and is then transferred by line 23 to a solid quench chamber 24 wherein its temperature is further reduced, say to 575° F. and the vapors are then transferred by line 25 through heat exchanger 26 to a vapor separator 27. The final cooling step (heat exchanger 26) may alternatively be conducted by a second liquid quench as water or cold oil. The reaction mixture enters vapor separator 27 at a suitable low temperature such as 100° F. and vapors are taken overhead by line 28 for separation of gaseous products. The liquid phase in separator 27 is transferred to a settling zone (not shown) by line 29 wherein oil and water are separated. The separated water may be used for admission to the reactor at line 21 and as quench water at line 22 since any contaminating deposits in the water so used are laid down on the granular solid and later removed by combustion in heater 10 and air preheater 32. The oil may be recycled in whole or in part to the reactor as desired. Generally best results are obtained by the use of virgin charge but high yields of aromatic by-products can be obtained by recirculation of oil in the system.

Granular solids at elevated temperature leave quencher 24 by feed leg 30 and pass downwardly through the steam sealing chamber 31 to a cooler 32 which preferably also functions to preheat air for use in the burners of heater 10. The cooled granular solid is transferred by pipe 33 through valve 34 and purging chamber 15' to an elevator 35, from the top of which it passes by pipe 36 and classifier 37 to a feed hopper 38. Granular solids from the feed hopper 38 are then transferred by feed leg 39 through steam sealing chamber 40 to the quencher.

Air for cooling granular solids in cooler 32 is supplied by blower 41 and heated air is withdrawn from the cooler by pipe 42 and transferred to the heater wherein it is used to burn fuel supplied by line 43.

The details and operation of the heater are seen by reference to Figures 2 and 3. Essentially, the heater comprises a shell 44 having two tube sheets 45 and 46 dividing the same into an upper preheating zone, an intermediate combustion and high temperature heating zone and a lower combustion and high temperature heating zone. The preheating zone is essentially set up to operate as two successive preheating sections but flow of gases between the two sections is not efficiently inhibited as is flow between the preheating and intermediate high temperature zone and between the two high temperature zones.

In each of the high temperature zones a number of feed pipes 47 depend from the tube sheet to provide paths of restricted cross-section for passage of the granular solids. This largely inhibits upward flow of gases and causes equal distribution of flowing solids across the heater. The feed tubes 47 also provide an open space below the tube sheet in which are installed air feed headers 48 and fuel headers 49. Air and fuel from the headers are supplied to burners 50 which may be no more than concentric pipes as shown. The burners 50 provide a flame which is preferably directed onto the surface of the granular solids lying at an angle below the open lower end of feed tubes 47. Combustion is very efficient because of the catalytic effect of solid surfaces and high temperature products of combustion are generated in direct contact with the granular solids. The products of combustion in the first high temperature zone are removed by the gas collector 51 and transferred by line 52 to a gas distributor 53 in the preheating zone. Similarly, the products of combustion in the lower high temperature zone are removed by collector 54 and transferred by line 55 to distributor 56. Gas collectors 57 and 58 in the preheating zone induce countercurrent flow of the hot products of combustion in the upper preheating zone and the flue gases are transferred from the collectors 57 and 58 to a stack or economizer by line 59. It is preferred that the preheating zone be spaced a considerable distance from inlet pipe 18 at the top of the heater in order to provide a bulk supply of solids in the top of the heater and also to inhibit flow of gases upwardly to pipe 18 by the depth of solids in the top. Uniform flow in the bottom of the heater is induced by a plurality of flow plates 60, 61 and 62 having orifices spaced in substantially the manner shown.

As shown in Figure 4, the reactor 11 is enclosed by a shell 63 which is equipped with tube sheet 64 and 65. The space above the upper tube sheet 64 serves as a supply hopper from which high temperature granular solids are fed into a high temperature contacting zone by feed tubes 66 depending from the tube sheet 64. This provides a vapor sealing zone which inhibits the loss of gases upwardly from the reactor and the open space about the tubes 66 serves as a collection chamber from which vapors may be removed by pipe 23 and quenched with water by pipe 22 as noted above in connection with Figure 1.

As the granular solids move downwardly from tubes 66 they rapidly heat reaction vapor to the desired reaction temperature and are themselves cooled, reaching tube sheet 65 at a substantially reduced temperature, say 1000° F. Vapors from the lower preheating zone are transferred through the tube sheet 65 by pipes 67 to inverted angles 68 which serve as vapor distributors. The granular solids enter feed tubes 69 which function in the same manner as tubes 66 to provide a gas disengaging space in the nature of a plenum chamber. In this region preheated oil and water vapors from the lower part of the reactor are thoroughly mixed and equalized as to pressure for feeding into the upper high temperature reaction zone. In an intermediate portion of the preheating zone are a plurality of inverted troughs 70 which serve to distribute fluids supplied by pipes 71. In a typical operation the fluid from pipes 71 may be liquid oil which is vaporized and preheated by contact with the hot solids moving downwardly through the preheating zone. Similar distributors 72 and pipes 73 serve to supply water to the preheating zone in either vapor or liquid phase as desired. The water is preferably introduced as liquid since dirty water can be used in this manner thus avoiding the difficulties of purifying water to be used in conventional steam generators. Apertured flow control plates 74, 75 and 76 in the bottom of reactor 11 function in the same manner as plates 60, 61 and 62 in heater 10. In an operation where liquid oil and liquid water are admitted to the reactor granular solids may be withdrawn from the bottom of the reactor at a temperature on the order of 780° F.

A typical operation involving the temperatures noted above charges Michigan gas oil in liquid phase and dirty water to provide steam amounting to about 50.4% by weight of the amount of gas oil charge. A space velocity of 3.12 volumes of liquid oil at 60° F. per volume of reaction space, i. e., above tube sheet 65, is maintained using a weight ratio of 11.9 parts of granular solid to 1 part of oil in a bed depth of 24 inches. This gives a mean effective temperature of 1440° F. at a contact time of 0.29 second. Among the important products are 28.1% ethylene and 18.3% C₃ and C₄ olefins. The process also yields 5.5% depentanized motor gasoline having an octane number of 94.6 with 3 cc. of tetraethyl lead. The gasoline is highly aromatic and is also useful as solvents and the like.

We claim:

1. Apparatus for heating a granular solid comprising a vertical shell, an inlet for granular solid at the top of said shell, a granular solid outlet at the bottom of said shell, a first tube sheet intermediate the ends of said shell, a plurality of granular solid feed tubes piercing said first tube sheet and depending therefrom, a plurality of burners dispersed among said feed tubes, a first high temperature gas collector in said shell spaced below the bottom ends of said feed tubes, a second tube sheet in said shell below said first high temperature gas collector, a plurality of granular solid feed tubes piercing said second tube sheet and depending therefrom, a plurality of burners dispersed among said last mentioned feed tubes, a second high temperature gas collector in said shell spaced below the bottom ends of said last-mentioned feed tubes, means to pass gas from said first high temperature gas collector in direct contact with granular solid in a first low temperature contacting zone intermediate the top of said shell and said first tube sheet, and means to pass gas from said second high temperature gas collector in direct contact with granular solid in a second low temperature contacting zone intermediate said first zone and said first tube sheet.

2. Apparatus for heating a granular solid comprising a vertical shell, an inlet for granular solid at the top of said shell, a granular solid outlet at the bottom of said shell, a first tube sheet intermediate the ends of said shell, a plurality of granular solid feed tubes piercing said first tube sheet and depending therefrom, a plurality of burners dispersed among said feed tubes and directed to project a flame against and into granular solids below said feed tubes, a first high temperature gas collector in said shell spaced below the bottom ends of said feed tubes, a second tube sheet in said shell below said first high temperature gas collector, a plurality of granular solid feed tubes piercing said second tube sheet and depending therefrom, a plurality of burners dispersed among said last-mentioned feed tubes and directed to project a flame against and into granular solids below said last-mentioned feed tubes, a second high temperature gas collector in said shell spaced below the bottom ends of said last-mentioned feed tubes, means to pass gas from said first high temperature gas collector in direct contact with granular solid in a first low temperature contacting zone intermediate the top of said shell and said first tube sheet, and means to pass gas from said second high temperature gas collector in direct contact with granular solid in a second low temperature contacting zone intermediate said first zone and said first tube sheet.

3. Apparatus for heating a granular solid comprising a vertical shell, an inlet for granular solid at the top of said shell, a granular solid outlet at the bottom of said shell, a tube sheet intermediate the ends of said shell, a plurality of granular solid feed tubes piercing said tube sheet and depending therefrom, a plurality of burners dispersed among said feed tubes, a high temperature gas collector in said shell spaced below the bottom ends of said feed tubes, a gas distributor in said shell at a level above said tube sheet but spaced a substantial distance below the top of said shell, conduit means connected between said collector and distributor for passage of gas, and an outlet for gas above said tube sheet and spaced apart from said distributor.

4. Apparatus for heating a granular solid comprising a vertical shell, an inlet for granular solid at the top of said shell, a granular solid outlet at the bottom of said shell, a tube sheet intermediate the ends of said shell, a plurality of granular solid feed tubes piercing said tube sheet and depending therefrom, a plurality of burners dispersed among said feed tubes and directed to project a flame against granular solids below said feed tubes, conduit means to supply a fluid fuel to said burners, conduit means to supply a combustion supporting gas to said burners, a high temperature gas collector in said shell spaced below the bottom ends of said feed tubes, and means to pass gas from said first high temperature gas collector in direct contact with granular solid in a first low temperature contacting zone intermediate the top of said shell and said first tube sheet.

5. Apparatus for heating a granular solid comprising a vertical shell, an inlet for granular solid at the top of said shell, a granular solid outlet at the bottom of said shell, a first control means intermediate the ends of said shell to permit downward flow of granular solid and inhibit upward flow of gases, a plurality of burners below said first control means, a first high temperature gas collector in said shell spaced below said burners, a second control means in said shell below said first high temperature gas collector to permit downward flow of granular solid and inhibit upward flow of gases, a plurality of burners below said second control means, a second high temperature gas collector in said shell spaced below said last-mentioned burners, means to pass gas from said first high temperature gas collector in direct contact with granular solid in a first low temperature contacting zone intermediate the top of said shell and said first control means, and means to pass gas from said second high temperature gas collector in direct contact with granular solid in a second low temperature contacting zone interminate said first zone and said first control means.

6. Apparatus for heating a granular solid comprising a vertical shell, an inlet for granular solid at the top of said shell, a granular solid outlet at the bottom of said shell, a control means intermediate the ends of said shell to permit downward flow of granular solids and inhibit upward flow of gases, a plurality of burners below said control means, a high temperature gas collector in said shell spaced below said burners, and means to pass gas from said high temperature gas collector in direct contact with granular solid in a low temperature contacting zone intermediate the top of said shell and said control means.

7. Apparatus for heating a granular solid comprising a vertical shell, an inlet for granular solid at the top of said shell, a granular solid outlet at the bottom of said shell, a control means intermediate the ends of said shell to permit downward flow of granular solid and inhibit upward flow of gases, a plurality of burners below said control means directed to project a flame against and into granular solid below said control means, conduit means to supply fluid fuel to said burners, and conduit means to supply a combustion supporting gas to said burners, a high temperature gas collector in said shell spaced below said burners, a gas distributor and a gas outlet spaced therefrom both in the upper part of said shell above said control means but spaced a substantial distance below said inlet for granular solid, a conduit connected between said high temperature collector and said distributor for passage of the gas from the high temperature collector to said distributor in the upper portion of said shell.

8. A process for heating a granular solid which comprises passing said solid downwardly through a heater including an upper preheating zone, an intermediate heating zone and a lower high temperature zone, inhibiting flow of gases between said zones except as hereinafter recited, generating hot products of combustion and contacting said products of combustion with granular solid in each of said intermediate and lower zones, transferring products of combustion, contacted as aforesaid, from said intermediate zone to the upper part of said preheating zone, there contacting the said products of combustion from said intermediate zone with granular solid in said upper part of said preheating zone, transferring products of combustion, contacted as aforesaid, from said lower zone to the lower part of said preheating zone and there contacting the said products of combustion from said lower zone with granular solid in said lower part of said preheating zone.

9. A process for heating a granular solid which comprises passing said solid downwardly through a heater, including an upper preheating zone, an intermediate heating zone and a lower high temperature zone, inhibiting flow of gases between said zones except as hereinafter recited, generating hot products of combustion and contacting said products of combustion with granular solid in each of said intermediate and lower zones by projecting a flame downwardly into the upper sections of the beds of granular solid therein, passing the products of combustion downwardly within the beds in each of said intermediate and lower zones, transferring products of combustion, contacted as aforesaid, from the lower section of said intermediate and lower zones to said upper zone and there contacting the said products of combustion with granular solid in said upper zone to preheat the same.

10. A process for heating a granular solid which comprises passing said solid downwardly through a heater including an upper preheating zone, an intermediate heating zone and a lower high temperature zone, inhibiting flow of gases between said zones except as hereinafter recited, generating hot products of combustion and contacting said products of combustion with granular solid in each of said intermediate and lower zones by projecting a flame into the beds of granular solid therein, transferring products of combustion, contacted as aforesaid, from said intermediate zone to the upper part of said preheating zone, there contacting the said products of combustion from said intermediate zone with granular solid in said upper part of said preheating zone, transferring products of combustion, contacted as aforesaid, from said lower zone to the lower part of said preheating zone and there contacting the said products of combustion from said lower zone with granular solid in said lower part of said preheating zone.

11. A process for heating granular solid material which comprises, passing said solid material downwardly through a confined zone as a gravitating column, introducing a burning mixture of a fuel and a combustion supporting gas downwardly into a lower section of said column and passing the mixture downwardly within said column to complete the burning of the fuel and to effect heating of the solid material to a high temperature, withdrawing hot gaseous combustion products from a low level in said column and reintroducing it into said column at a level spaced above the level of said fuel introduction, passing the reintroduced combustion products upwardly through an upper portion of said column to preheat the incoming solid material and then withdrawing the gaseous combustion products from said column and substantially restricting the horizontal cross sectional area of the flowing column along a portion of its length intermediate the levels of fuel introduction and said combustion products reintroduction to inhibit substantial gas flow through the column between said levels.

GEORGE L. JOHNSON.
JOHN HAPPEL.
WILLIAM A. HAGERBAUMER.

REFERENCES CITED

The following references are of record in the file of this patent:

UNITED STATES PATENTS

| Number | Name | Date |
|---|---|---|
| 2,399,450 | Ramseyer | Apr. 30, 1946 |
| 2,409,707 | Roetheli | Oct. 22, 1946 |
| 2,416,214 | Payne | Feb. 18, 1947 |
| 2,420,049 | Martin | May 6, 1947 |